Nov. 26, 1946.   C. A. PAVEY   2,411,668
AIRPLANE TIRE PREROTATING MEANS
Filed Sept. 9, 1942

INVENTOR
CLARENCE A. PAVEY
BY Reynolds & Beach
ATTORNEYS

Patented Nov. 26, 1946

2,411,668

UNITED STATES PATENT OFFICE 2,411,668

AIRPLANE TIRE PREROTATING MEANS

Clarence A. Pavey, Seattle, Wash.

Application September 9, 1942, Serial No. 457,695

12 Claims. (Cl. 244—103)

When a land-type airplane lands its wheel tires must, in a very short period of time, acquire a rotative velocity equivalent to the ground speed of the airplane at the moment of contact. With small wheels this entails a high rate of rotation, and with larger wheels having greater inertia it entails greater resistance to acquisition of this rotational velocity. In any case there is very considerable tire wear as a result, and consequent increase in the possibility of failure of the tire at this or the next landing.

There have been various attempts to overcome this difficulty. According to certain proposals the tire and wheel are positively rotated while in the air by motor means, but this adds appreciably to the weight and complication in the landing gear. According to other proposals, for example the patent to Schumacher, No. 1,834,427, vanes, so shaped as to form pockets, stand out from the side wall of the tire, in order to catch the relative wind, and thus start the tire to rotating before the airplane has landed. According to such proposals, however, the vanes have remained projecting at all times, and not only tend to interfere with the landing gear itself, and with the wheel well, if the landing gear is retractable, but also, because of their projection, produce so much drag when moving against the relative wind that they are slow in operation, and do not produce rotation at a sufficiently high rate of speed, or with sufficient rapidity, as to be materially helpful.

In consequence of these difficulties tire prerotating devices have not gone into use, but I have discovered how the drag of such vanes can be materially lessened, when they are turning counter to the relative wind, and how they may be caused to take full advantage of the rotating force of the wind when turning with it, throughout substantially a full half-revolution, so that their action is much more rapidly effective, and the rotation which they cause is at a much higher rate of speed, than was hitherto considered possible with similar devices. Speaking generally, this is done by making the vanes of collapsible material, so that the relative wind, when they are uppermost on the tire, will collapse them against the tire's side wall.

I have discovered, however, that while such collapsing in and of itself produces superior results, these results can be further improved. Such vanes, collapsed flat against the tire side wall, will occasionally tend to "freeze" against the side wall, and will not readily open even when presented at a rather appreciable angle to the relative wind in the lowermost part of the tire's rotation. Unless they do open promptly and dependably they will not catch the relative wind in sufficient amounts, or sufficiently early in the rotational cycle, to produce the desired acceleration. I have discovered, therefore, how such vanes, though collapsible, may be made to open promptly and fully, to gain the greatest advantage from the relative wind, and thereby to produce the most rapid and forceful acceleration. This I accomplish by providing means to insure the presentation of a pocket opening to the relative wind at the earliest possible instant. Preferably this is done passively, by providing the vanes with stiffeners, which may be streamlined in themselves, and of small frontal area, but which hold open a sufficient opening to catch the relative wind at the earliest possible instant, thereby to admit air to the interior of the pocket, and to initiate early opening of the pocket as a whole.

The principles of my invention will be best understood as this specification progresses, with reference to the accompanying drawing, and its novel features will be understood from the claims which are found at the end of this specification.

Figure 1:
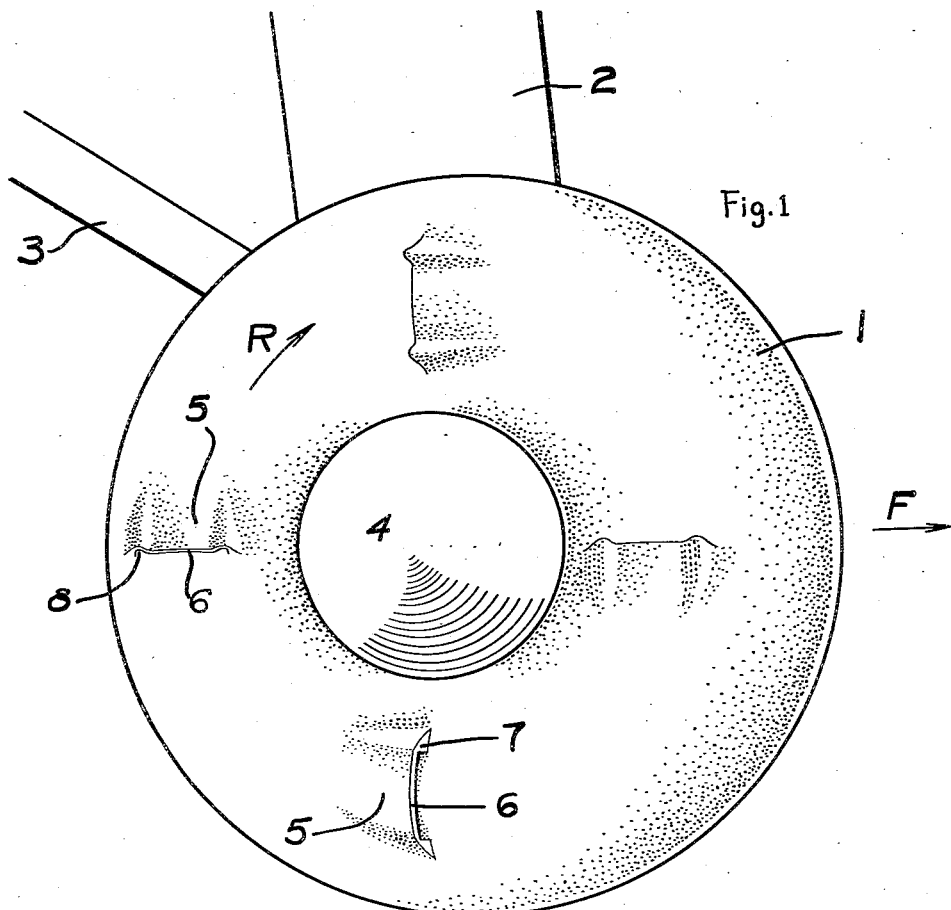
Figure 1 is a perspective view of an airplane tire, and a part of the landing gear, shown in position ready for landing.
Figure 2:
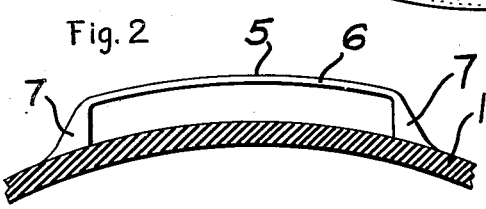
Figure 2 is a fragmentary cross-section through the side wall of such a tire, looking into the pocket which catches the air.

The tire 1 is mounted upon a landing gear, such as is represented by the compression strut or oleo 2 and the drag strut 3. The landing gear may be fixed or retractable, and it is immaterial whether the wheel 4 be considered as one of the main landing wheels or as a nose wheel or a tail wheel. The direction of flight is indicated by the arrow F, pointing forwardly, and the direction of rotation, when ground-borne, is indicated by the arrow R.

Such a tire, of rubber or the like, has flaps or vanes 5 formed upon at least one side wall. Each of these vanes has a radial edge 6 which is unsecured to the tire, but except for this edge all edges of the vane are secured or joined to the side wall of the tire. The side edges may be joined to the tire through the medium of stiffeners 7, which are shown as walls of rubber, streamlined in the circumferential direction, and of generally triangular cross-section, and projecting from the tire's side wall. If they are made of rubber, as is preferred, they may be formed as an integral part of new tires, and on tires already made they may be secured by vulcanization. Preferably these projecting stiffeners are arranged in pairs, spaced apart radially of the tire. The vane 5 is also preferably made of relatively thin flexible rubber, although it may be reinforced, to whatever extent is found necessary, with fabric or like material. It is, however, relatively flexible, so that it may collapse or extend under the influence of the relative wind.

Figure 3:
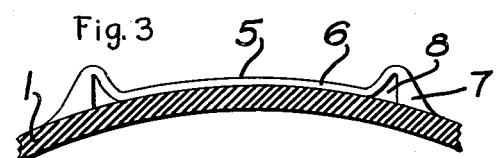
Figure 3 is a similar view showing the pocket collapsed.

Whenever the edge 6 of the vane faces in the direction of flight, as it does as soon as it drops below the axis of rotation in Figure 1, the vane is capable of forming a pocket to catch the relative wind, and to create a rotative force acting on the tire to rotate it in the direction R in which it would rotate when rolling forwardly in contact with the ground. However, when the rotation has carried this particular vane upwardly substantially to a level with the axis of the tire's rotation, the relative wind acting upon its outer side will tend to collapse it, and since the vane is flexible it will collapse, as shown in Figure 3, and its drag is negligible. The projections 7, being non-collapsible, will remain upstanding. They are streamlined, however, and their bulk is slight, consequently they produce but slight drag. Nevertheless they offer sufficient resistance to collapse of that portion of the vane 5 that is immediately adjacent that they produce, when collapsed, small pockets 8, alongside the inner surface of each such stiffener. These pockets not only help in fairing out the streamline contour of the stiffeners, to prevent turbulence and lessen drag, but also serve, as soon as the pocket has reached horizontal position again, as shown at the right in Figure 1, to catch the relative wind, and to permit its entrance into the pocket as a whole. Immediately the relative wind enters the tiny pocket 8 the vane is blown away from the tire side wall, against which it has been collapsed, and the pocket is now open to the full to catch the relative wind, and to act throughout substantially a full half-revolution, in initiating rotation of the tire in the direction of the arrow R.

While only four such vanes have been shown in Figure 1, these have been shown primarily to represent the four principal positions which a given vane would occupy during a single rotation. It is not intended to limit the number of vanes to four, for as many may be used as are found necessary, or as can be used without interfering one with another. The minimum practical number is three, but ordinarily an appreciably larger number would be used. They can be employed on one side only of the tire, or on both sides, as circumstances require or permit.

Figure 4:
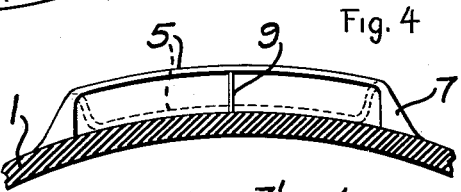
Figure 4 is a view similar to Figure 2, showing a slightly modified form.

If it is found that the span between the stiffeners 7 is so great that the flexible vane 5 will tend to belly out unduly away from the side wall of the tire, it may be held close at intermediate points by a flexible tension or tie member, such as is indicated at 9 in Figure 4. This extends between an intermediate point of the vane and the side wall of the tire, and can be made of thin material of sufficient flexibility that it does not appreciably affect the collapsing of the vane as a whole, when turning counter to the relative wind, or it can be made of stiffer material to function as an intermediate stiffener.

Figure 5:
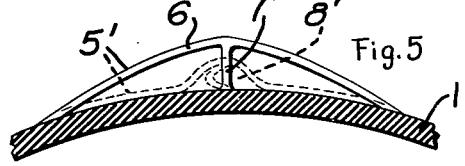
Figure 5 is a view similar to Figure 2, showing a further modified form.

The vane shown in Figure 1 is substantially rectangular in shape, and the pocket has a rectangular opening. Each of these particulars may vary, however, and in Figure 5 the pocket opening has been shown as triangular. Here a single projection 7' is used, which, however, is still sufficiently stiff to prevent complete collapse of the vane 5' at this point, and to leave the pocket 8' to catch the relative wind and initiate opening of the pocket as a whole.

Figure 6:
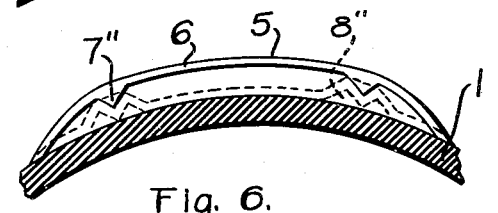
Figure 6 is a view similar to Figure 2, showing a still further modification.

It is not essential that the stiffeners or projections be mounted upon the tire, nor that they constitute the means for joining the edges of the vane to the tire. Their function is to hold open a small pocket for initial entrance of air, and in Figure 6 they have been shown at 7'' mounted upon the vane 5, within the pocket. While they tend somewhat to stiffen the edges of the pocket, they function in this case more as spacers, to hold open the pockets 8'' when the vane is collapsed. They would serve nearly as well, if they were mounted upstanding from the outside of the tire 1.

The projections 7, 7', and 7'' serve to hold open an entrance to the pocket, and are preferred because they can be made in a simple manner, of rubber, molded to the tire or to the vane, or to both. It should not be overlooked, however, that the ultimate end is the prompt opening and collapse of the pocket, at proper times, and other means to this end, perhaps positively acting, might be substituted for the passively acting stiffeners.

What I claim as my invention is:

1. In combination with an airplane tire, a plurality of vanes angularly spaced about the tire's side wall, and joined thereto at sides and rear to define pockets each of which opens, when lowermost, towards the forward direction to catch the relative wind, each said vane being of flexible material to collapse substantially flat against the tire, when uppermost, by the action of the relative wind, but each including a portion considerably thicker than the thickness of the major portion of the vane, operable to hold open a portion of the pocket alongside such thicker portion when the remainder is collapsed, to catch the relative wind and to initiate opening of the pocket immediately the pocket opening faces somewhat forwardly.

2. In an airplane landing gear including a landing wheel, the combination of collapsible and extensible means carried by said landing wheel and adapted for the impingement of air thereagainst during the flight of the airplane for rotating said landing wheels in a forwardly-rolling direction when ground-borne, and means supplementary to said first means operable when said first means are collapsed to hold a portion thereof in air-receiving position, for prompt extension when again impinged by the relative wind.

3. An airplane tire having a series of vanes each capable of collapsing against and of distending from a side wall of the tire, to define a pocket between itself and the tire wall which opens towards the direction of flight at a point below the axis of the tire's rotation, and at least one spacer member interposed between each vane and the side wall of the tire acting when the vane is in collapsed condition to space a portion of the vane from the tire's side wall.

4. An airplane tire having a series of angularly spaced streamlined stiffeners outstanding from and disposed generally in a circumferential direction about at least one side wall, and a flap of collapsible material joined to said stiffener and, at a radially spaced point, to the tire's side wall, to define a pocket which has its opening directed forwardly while it is below the tire's axis of rotation.

5. An airplane tire having radially spaced stiffeners arranged in pairs angularly spaced about, outstanding from, and disposed generally in a circumferential direction about at least one side wall, and a flap of collapsible material extending between said stiffeners and joined along one edge to the side wall, to define a pocket which has its opening directed forwardly while it is below the tire's axis of rotation.

6. An airplane tire having radially spaced stiffeners arranged in pairs angularly spaced about, outstanding from, and disposed generally in a circumferential direction about at least one side wall, a flap of collapsible material extending between said stiffeners and joined along one edge to the side wall, to define a pocket which has its opening directed forwardly while it is below the tire's axis of rotation, and a collapsible tension element disposed intermediate said stiffeners, and extending between the side wall and the flap to limit the pocket's opening at such intermediate point.

7. An airplane tire of rubber having a series of angularly spaced streamlined stiffeners of rubber of generally triangular cross-section outstanding from and disposed generally in a circumferential direction about at least one side wall, and a thin, collapsible rubber vane joined to the upper edge of said stiffener, and, at a radially spaced point, to the tire's side wall, and, along its rear edge, to said side wall, to define a generally collapsible pocket which has its opening directed forwardly while it is below the tire's axis of rotation.

8. In combination with an airplane tire, a plurality of vanes angularly spaced about the tire's side wall, and each joined thereto at sides and rear to define a pocket which opens, when below the tire's axis of rotation, towards the forward direction to catch the relative wind, each such vane being of flexible material to collapse against the tire's side wall, when above the tire's axis of rotation, by the action of the relative wind, and a tie member interconnected between each vane and the portion of the tire's side wall intermediate the side edges of the vane, operable to limit the movement of a portion of the vane intermediate its side edges away from the tire side wall.

9. In a combination with an airplane tire, a plurality of vanes angularly spaced about the tire's side wall, and each joined thereto at sides and rear, its front edge being free, to define a main pocket which opens, when below the tire's axis of rotation, towards the forward direction to catch the relative wind, each such vane being of flexible material to collapse against the tire's side wall, when above the tire's axis of rotation, by the action of the relative wind, and means disposed generally transversely of each vane at its front to define a small pocket when the vane is collapsed, for initial admission of the relative wind and for distension of the vane to form the main pocket by consequent enlargement of the small pocket.

10. In combination with an airplane tire, a plurality of vanes angularly spaced about the tire's side wall, and each joined thereto at sides and rear to define a pocket which opens, when below the tire's axis of rotation, towards the forward direction to catch the relative wind, each such vane being of flexible material to collapse substantially flat against the tire, when above the tire's axis of rotation, by the action of the relative wind, and a spacer rib supported from the inner side of the vane, inwardly of its side margin, extending generally circumferentially of the tire, and of a height to retain open a small pocket defined between itself, the vane, and the tire, when the vane has been collapsed.

11. An airplane tire having a series of vanes each of material sufficiently limp that it may collapse against and distend from a side wall of the tire, to define a pocket between itself and the tire wall which opens towards the direction of flight at a point below the axis of the tire's rotation, each such vane including at least one portion, extending lengthwise of the pocket, and of increased stiffness acting at all times to space an adjoining portion of the vane from the tire's side wall, for initial entrance of distending air when again impinged by the relative wind.

12. In combination with an airplane tire, a plurality of vanes angularly spaced about the tire's side wall, and each joined thereto along a forward edge, relative to the sense of rotation, to open forwardly, relative to the flight path, by impingement of relative air when below the tire's axis of rotation, and of material sufficiently flimsy to collapse against the tire's side wall under the influence of the relative wind when above such axis of rotation, and a tie member interconnected between each such vane and the tire's side wall, intermediate the radially outer and inner margins of said vane, of a length to limit the opening movement of the vane.

CLARENCE A. PAVEY.